United States Patent
Lin

(10) Patent No.: US 9,513,500 B2
(45) Date of Patent: Dec. 6, 2016

(54) FIXING DEVICE FOR AN LCD MODULE AND A FACEPLATE

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONICS CO., LTD., Taichung (TW)

( * ) Notice: Subject to any disclaimer, the term of this patent is extended or adjusted under 35 U.S.C. 154(b) by 107 days.

(21) Appl. No.: 14/684,613

(22) Filed: Apr. 13, 2015

(65) Prior Publication Data

US 2016/0299374 A1    Oct. 13, 2016

(51) Int. Cl.
  *G02F 1/1333*    (2006.01)
  *G02F 1/1335*    (2006.01)
  *G02F 1/1345*    (2006.01)

(52) U.S. Cl.
  CPC ..... *G02F 1/133308* (2013.01); *G02F 1/13452* (2013.01); *G02F 2001/133314* (2013.01); *G02F 2001/133322* (2013.01)

(58) Field of Classification Search
  CPC ............ G02F 1/13452; G02F 1/133308; G02F 2001/133322
  See application file for complete search history.

(56) References Cited

U.S. PATENT DOCUMENTS 6,070,673 A * 6/2000 Wendte ................. G01C 21/20
                                                172/2
6,480,243 B2 * 11/2002 Yamamoto ............ G06F 1/1601
                                                312/242

* cited by examiner

*Primary Examiner* — Dung Nguyen
(74) *Attorney, Agent, or Firm* — Ming Chow; Sinorica, LLC

(57) ABSTRACT

A fixing device for an LCD module and a faceplate includes a frame having one side fixing an LCD module and another side provided with plural fixing plates respectively bored with an elongated insert hole. A circuit board is secured at a rear side of a faceplate and provided with plural locking plates corresponding with the fixing plates so that the fixing plates of the frame can be respectively secured with the locking plates. Thus, relative positions of an LCD module and a faceplate can be adjusted and hence LCD modules different in thickness can be firmly fixed with a faceplate and the surface of the LCD module can be stably kept flush with the surface of the faceplate.

5 Claims, 8 Drawing Sheets

FIXING DEVICE FOR AN LCD MODULE AND A FACEPLATE

BACKGROUND OF THE INVENTION

1. Field of the Invention

This invention relates to a fixing device for an LCD module and a faceplate.

2. Description of the Prior Art

LCD modules have excellent display effects so LCD modules are extensively used for faceplates of equipment for display of information. In consideration of equipment cost, traders on the market usually purchase ready-made LCD modules and faceplates and have them assembled together. Referring to FIG. 1, a conventional LCD module 1 is first fixed with a frame 3 and then, the frame 3 is secured with a faceplate 2 to have the LCD module 1 fixed on the faceplate 2.

Referring to FIGS. 2 and 3, since the LCD modules 1 purchased from the market are different in the thickness; therefore, after the LCD module 1 and the faceplate 2 are assembled together, the LCD module 1 is likely to protrude out of the faceplate 2 or sink into the faceplate 2, impossible to make the surface of the LCD module 1 flush with the surface of the faceplate 2 and further, when a user frequently presses and operates the LCD module 1, the LCD module 1 is apt to sink into the faceplate 2 and impossible to recover its original state, thus inconvenient in operating and using the LCD module 1. In view of the above-mentioned defect, the inventor this invention thinks that the conventional fixing structure for an LCD module and a faceplate is necessary to be ameliorated and therefore, by long-term research and development of related filed of technology, the inventor of this invention devises this invention.

SUMMARY OF THE INVENTION

The objective of this invention is to offer a fixing device for an LCD module and a faceplate, able to fix different-thick LCD modules with faceplates and precisely keep the surface of various LCD modules flush with the surface of faceplates.

The fixing device for an LCD module and a faceplate in the present invention includes a frame able to be inserted through a faceplate and provided with at least one fixing member at one side for securing an LCD module so that the LCD module can be fixed at one side of the frame and emerges from the faceplate. The frame has another side provided with a plurality of fixing plates respectively bored with an elongated insert hole whose longitudinal axis is approximately perpendicular to the frame. Plural projecting posts are provided at the rear side of the faceplate and respectively formed with an axial locking hole so that a circuit board can be fixed at the rear side of the faceplate via the projecting posts, and a distance can be formed between the circuit board and the faceplate. Plural locking plates are mounted at the peripheral side of the circuit board to correspond with the fixing plates of the frame. Plural locking fasteners are to be inserted through the elongated insert holes of the fixing plates to have the fixing plates of the frame locked on the locking plates of the circuit board.

The fixing device for an LCD module and a faceplate of this invention is able to adjust the relative positions of the fixing plates of the frame and the locking plates of the circuit board via the elongated insert holes, and the locking fasteners can be transversely inserted through the elongated insert hole of the fixing plate at different locations for securing the fixing plate of the frame on the locking plate of the circuit board. Thus, the relative positions of the LCD module and the faceplate can be adjusted, and the surface of the LCD module can be stably kept flush with the surface of the faceplate.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
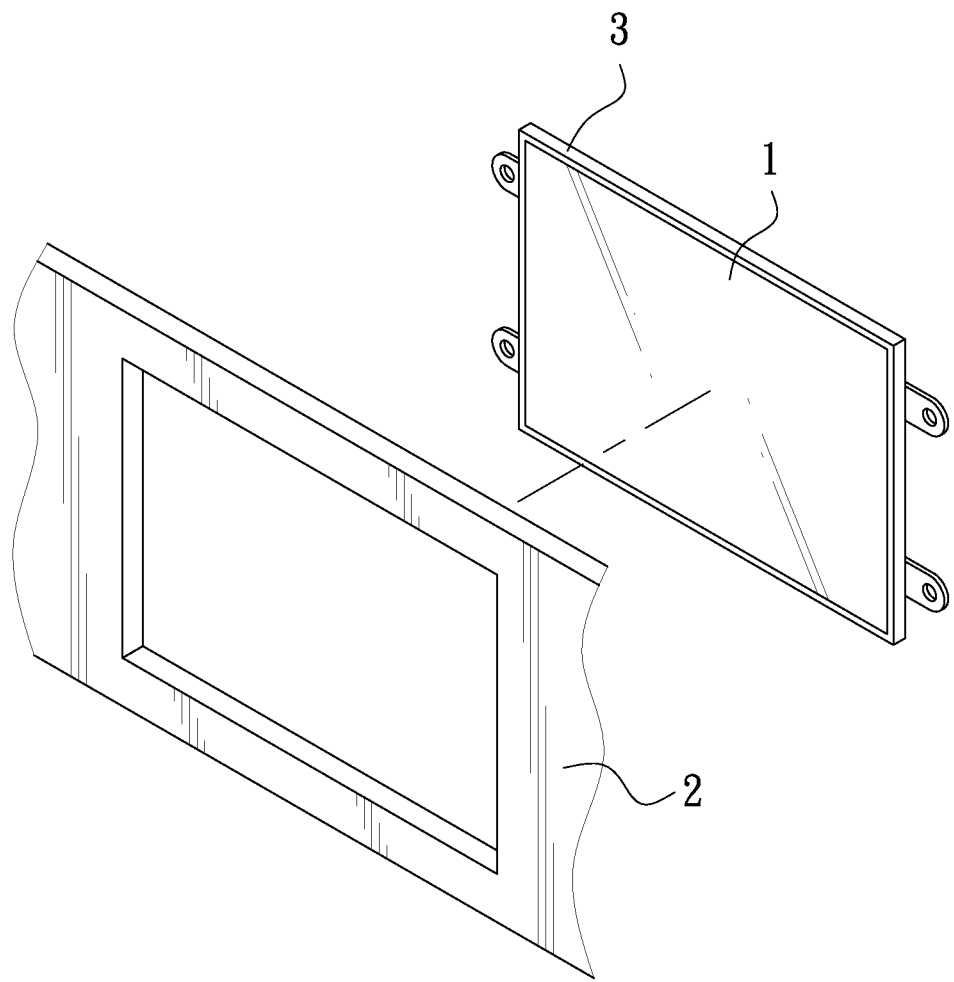
FIG. 1 is an exploded perspective view of a conventional LCD module and a faceplate.
Figure 2:
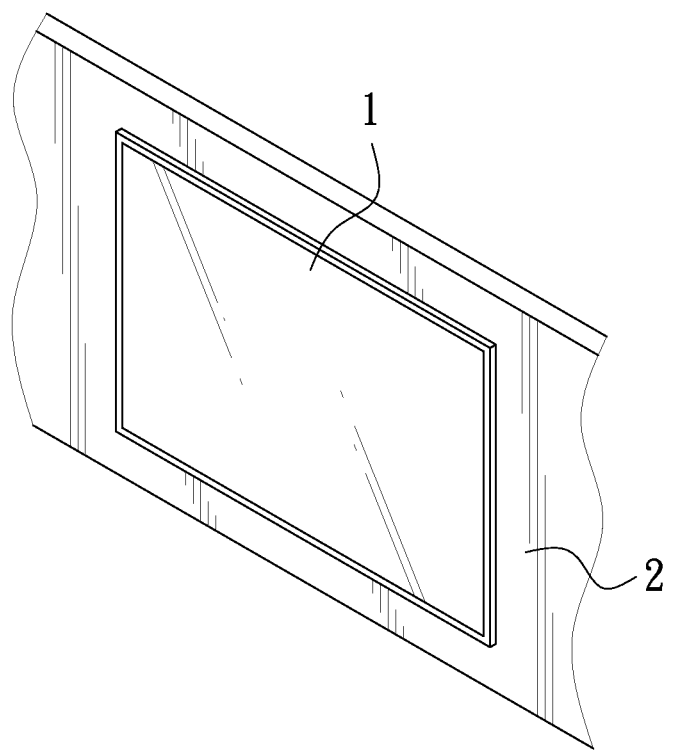
FIG. 2 is a schematic view of the conventional LCD module combined with a faceplate, showing a state that the LCD module protrudes out of the faceplate.
Figure 3:
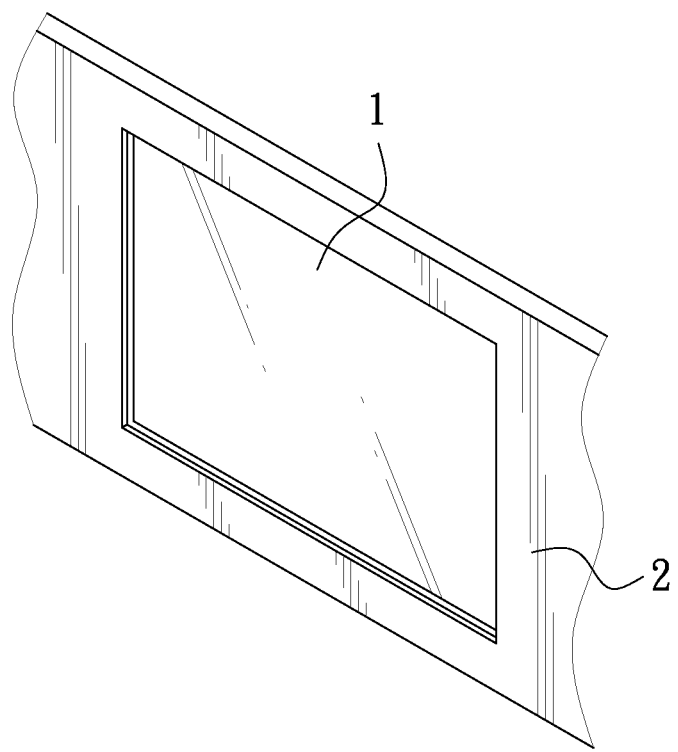
FIG. 3 is a schematic view of the conventional LCD module combined with a faceplate, showing a state that the LCD module sinks into the faceplate.
Figure 4:
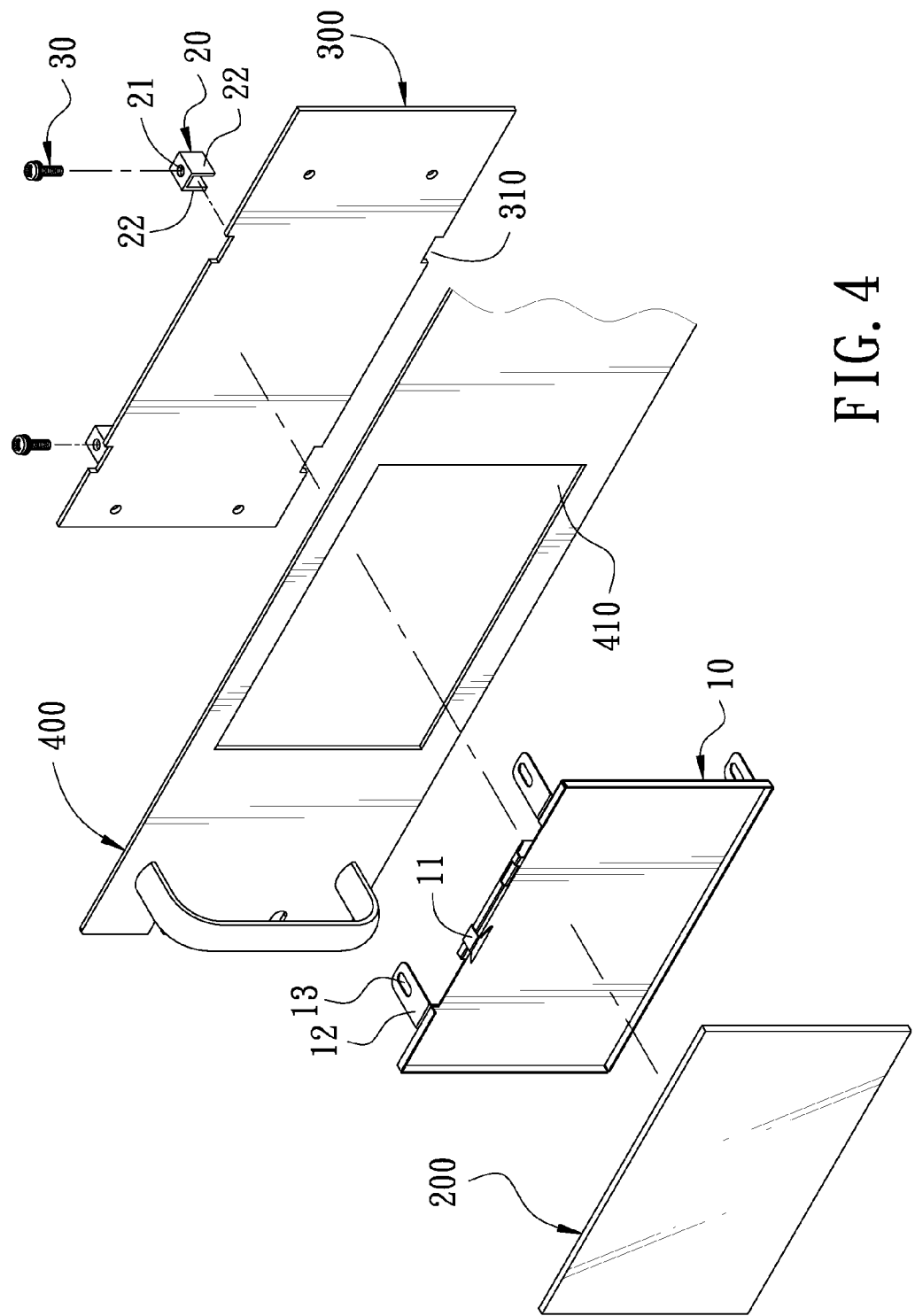
FIG. 4 is an exploded perspective view of a fixing device for an LCD module and a faceplate in the present invention.
Figure 5:
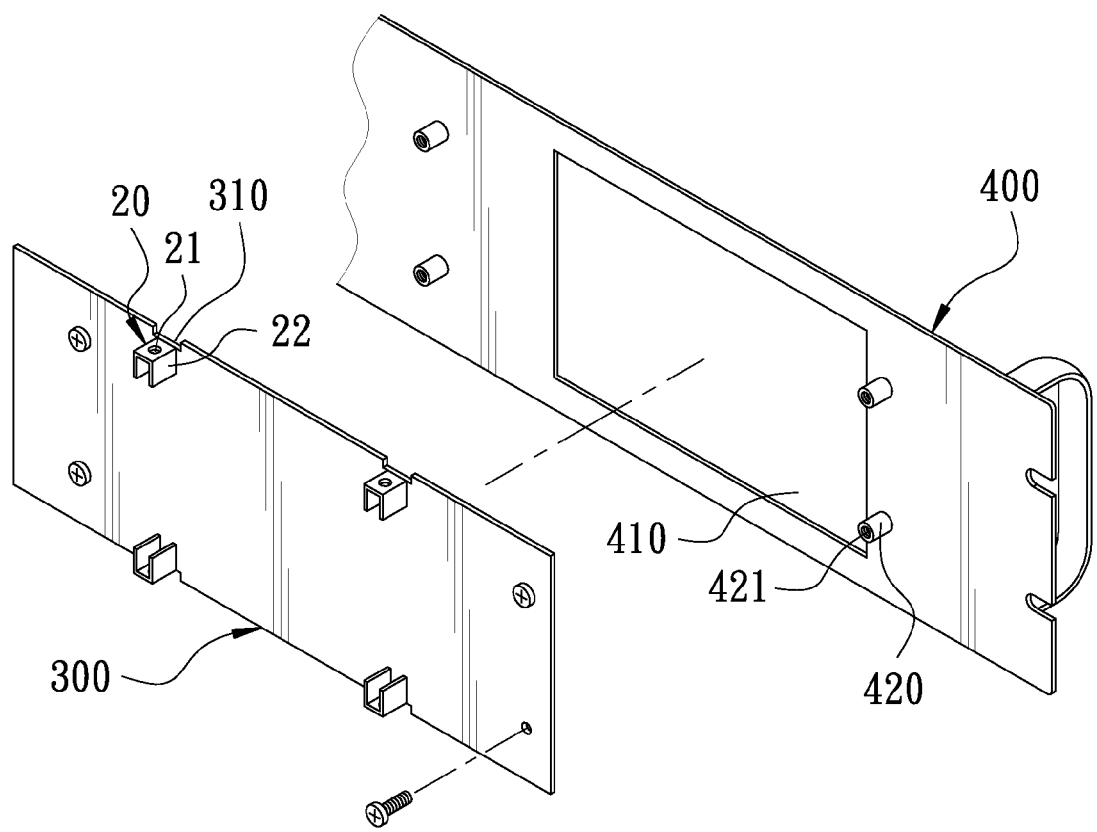
FIG. 5 is a schematic view of a circuit board to be assembled with a faceplate in the present invention.

A preferred embodiment of a fixing device for an LCD module and a faceplate in the present invention, as shown in FIGS. 4 and 5, is able to have an LCD module 200 and a circuit board 300 secured with a faceplate 400, which is bored with a rectangular opening 410 for the LCD module 200 to be inserted therein. The fixing device includes a frame 10, a plurality of projecting posts 420, a plurality of locking plates 20 and a plurality of locking fasteners 30 as main components combined together.

The frame 10 able to be inserted through the rectangular opening 410 of the faceplate 400 is formed with a rectangular plane surface corresponding to the LCD module 200 for the LCD module 200 to be set thereon and has one peripheral side provided with a fixing member 11. In this invention, the fixing member 11 is a spring clamp plate that protrudes out of one side on which the LCD module 200 is to be set so that the LCD module 200 can be fixed at one side of the frame 10 by means of the fixing member 11 and emerge from the rectangular opening 410 of the faceplate 400. The frame 10 has another side provided with a plurality of fixing plates 12 extending outward and corresponding to the peripheral side of the circuit board 300 and respectively bored with an elongated insert hole 13 whose longitudinal axis is perpendicular to the frame 10.

The projecting posts 420 are disposed at the rear side of the faceplate 400 and correspondingly positioned at the peripheral side of the rectangular opening 410 of the faceplate 400, respectively formed with an axial locking hole 421 and thus, the circuit board 300 corresponding with the rectangular opening 410 of the faceplate 400 can be firmly locked at the rear side of the faceplate 400, with a distance formed between the circuit board 300 and the faceplate 400.

The circuit board 300 has its peripheral edge provided with a plurality of inward recesses 310 corresponding to the fixing plates 12 of the frame 10 so that the fixing plates 12 of the frame 10 can be respectively and correspondingly received in the recesses 310, letting the elongated insert holes 13 of the fixing plates 12 protrude out of the recesses 310.

The locking plates 20 are mounted at the peripheral side of the circuit board 300 and respectively positioned at the lower edge of the recesses 310 for corresponding with the fixing plates 12 of the frame 10. Each locking plate 20 is provided with a round insert hole 21 corresponding to the elongated insert hole 13 of the fixing plate 12 and longitudinally formed with two opposite protruding edges 22 extending from the peripheral edge of the locking plate 20 toward the intermediate portion of the circuit board 300, letting the cross section of the locking plate 20 approximately form an ⊔-shape.

The locking fasteners 30 are respectively inserted through the elongated insert holes 13 of the fixing plates 12 and the round insert holes 21 of the locking plates 20 for locking the fixing plates 12 of the frame 10 on the locking plates 20 of the circuit board 300.

Figure 6:
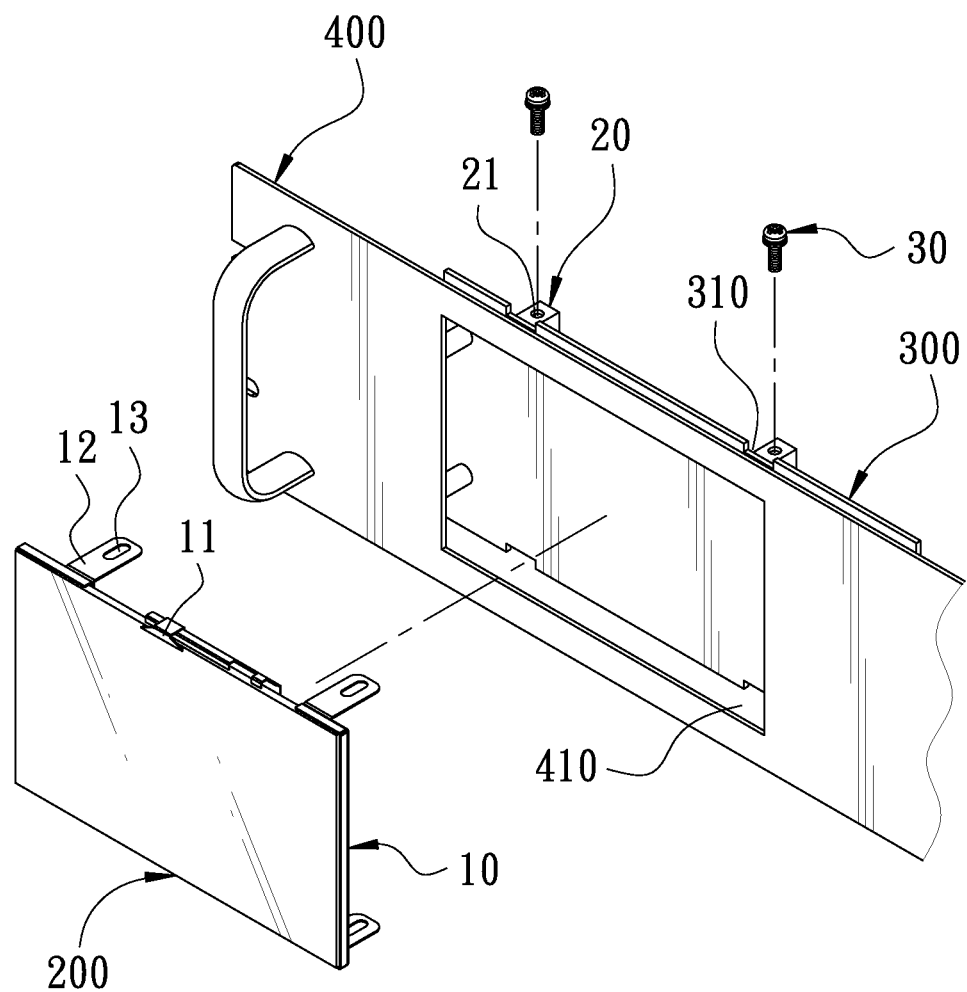
FIG. 6 is a schematic view of a frame to be assembled with the faceplate in the present invention.
Figure 7:
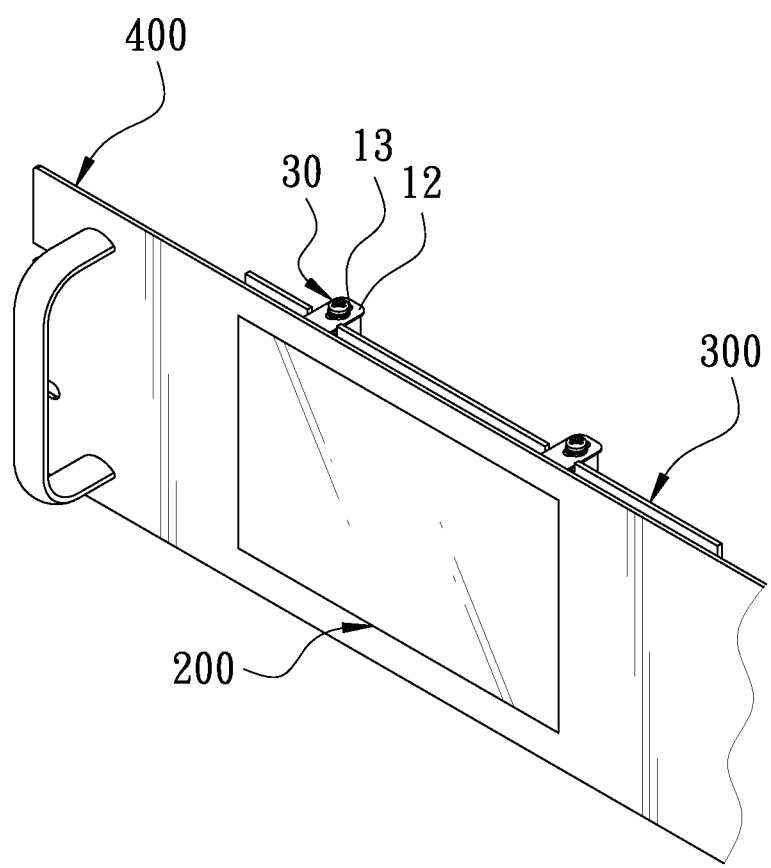
FIG. 7 is a schematic view of the combination of the LCD module with the faceplate in the present invention.
Figure 8:
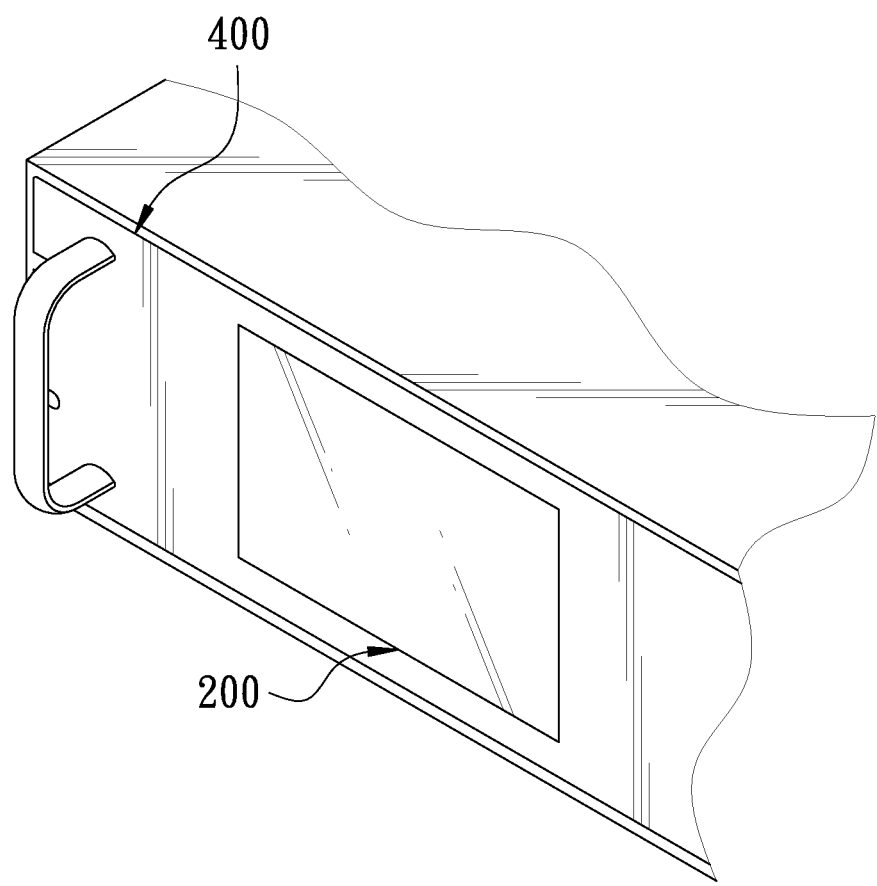
FIG. 8 is a schematic view of a finished product that the LCD module and the faceplate are combined together via the fixing device of this invention.

To fix the LCD module 200 with the faceplate 400, referring to FIGS. 5-7, firstly, the LCD module 200 is secured on the frame 10, and the circuit board 300 is firmly locked on the projecting posts 420 at the rear side of the faceplate 400 and then, the frame 10 has the fixing plates 12 facing the circuit board 300 to have the frame 10 inserted through the rectangular opening 410 from the front side of the faceplate 400 and further have the fixing plates 12 of the frame 10 restrictedly positioned in the recesses 310 of the circuit board 300. At this time, the fixing plates 12 of the frame 10 are respectively corresponding with the locking plates 20 of the circuit board 300, and the round insert holes 21 of the locking plates 20 are respectively aligned to the elongated insert holes 13 of the fixing plates 12. Subsequently, the locking fasteners 30 are inserted through both the elongated insert holes 13 of the fixing plates 12 and the round insert holes 21 of the locking plates 20 for securing the fixing plates 12 of the frame 10 on the locking plates 20 of the circuit board 300.

When the fixing plates 12 of the frame 10 are locked with the locking plates 20 of the circuit board 300, the elongated insert holes 13 of the fixing plates 12 enable the frame 10 to be adjusted longitudinally, letting the round insert hole 21 of the of the locking plates 20 correspond to different locations of the elongated insert holes 13 of the fixing plates 12 for adjusting the relative positions of the frame 10 and the circuit board 300 and hence achieve an effect of adjusting the relative positions of the frame 10 and the faceplate 400. Thus, when the frame 10 is adjusted and fixed in place, the surface of the LCD module 200 can be stably kept flush with the surface of the faceplate 400. By so designing, different-thick LCD modules 200 can be precisely fixed with the faceplate 400 at a same horizontal plane.

One of the special features of this invention is that when the locking fasteners 30 are transversely inserted through both the elongated insert holes 13 of the fixing plates 12 and the round insert holes 21 of the locking plates 20 for securing the fixing plates 12 of the frame 10 on the locking plates 20, the locking operation of the locking fasteners 30 is carried out when the LCD module 200 is pressed by a user. Therefore, the locking direction of the locking fasteners 30 are perpendicular to the direction that the user presses the LCD module 200 and hence the LCD module 200 can be stably fixed on the faceplate 400 and not easy to sink into the faceplate 400. Even through the LCD module 200 sinks into the faceplate 400 for some reason, a user can easily release the locking fasteners 30 and readjust the relative positions of the LCD module 200 and the faceplate 400 and then has the locking fasteners 30 transversely inserted through both the elongated insert holes 13 of the fixing plates 12 and the round insert holes 21 of the locking plates 20 for locking the fixing plates 12 of the frame 10 on the locking plates 20 anew and thus, the surface of the LCD module 200 and the surface of the faceplate 400 can be again kept flush with each other While the preferred embodiment of the invention has been described above, it will be recognized and understood that various modifications may be made therein and the appended claims are intended to cover all such modifications that may fall within the spirit and scope of the invention.

What is claimed is:

1. A fixing device for an LCD module and a faceplate, able to have an LCD module and a circuit board firmly fixed with a faceplate, which is formed with a rectangular opening for receiving said LCD module therein, said fixing device comprising:
   a frame able to be inserted through said rectangular opening of said faceplate, said frame provided with at least one fixing member for fixing said LCD module, said LCD module able to be fixed at one side of said frame and emerge from said rectangular opening of said faceplate, said frame having another side provided with a plurality of fixing plates extending outward horizontally, each said fixing plate bored with an elongated insert hole, longitudinal axis of said elongated insert hole approximately perpendicular to said frame;
   plural projecting posts provided at a rear side of said faceplate, said projecting posts positioned at a peripheral side of said rectangular opening of said faceplate, each said projecting post axially provided with a locking hole, said circuit board corresponding to said rectangular opening of said faceplate and secured at a rear side of said faceplate, a distance formed between said circuit board and said faceplate;
   plural locking plates disposed at a peripheral side of said circuit board, said locking plates respectively corresponding with said fixing plates of said frame; and
   plural locking fasteners to be transversely inserted in said elongated insert holes of said fixing plates for locking said fixing plates on said locking plates of said circuit board.

2. The fixing device for an LCD module and a faceplate as claimed in claim 1, wherein each said locking plate is longitudinally provided with at least one protruding edge.

3. The fixing device for an LCD module and a faceplate as claimed in claim 1, wherein circuit board has a peripheral edge provided a plurality of inward recesses at locations corresponding to said fixing plates of said frame.

4. The fixing device for an LCD module and a faceplate as claimed in claim 1, wherein a cross section of each said locking plate is approximately ⊔-shaped.

5. The fixing device for an LCD module and a faceplate as claimed in claim 1, wherein said fixing member of said frame is a spring clamp plate.

* * * * *